(12) United States Patent
Talon

(10) Patent No.: US 11,780,669 B2
(45) Date of Patent: Oct. 10, 2023

(54) CARTRIDGE AND MACHINE FOR MULTI-COMPONENT BEVERAGE PREPARATION

(71) Applicant: NESTEC S.A., Vevey (CH)

(72) Inventor: Christian Talon, Vufflens-le-Chateau (CH)

(73) Assignee: Societe des Produits Nestle S.A., Vevey (CH)

( * ) Notice: Subject to any disclaimer, the term of this patent is extended or adjusted under 35 U.S.C. 154(b) by 1181 days.

(21) Appl. No.: 16/461,978

(22) PCT Filed: Jan. 15, 2018

(86) PCT No.: PCT/EP2018/050909
§ 371 (c)(1),
(2) Date: May 17, 2019

(87) PCT Pub. No.: WO2018/130698
PCT Pub. Date: Jul. 19, 2018

(65) Prior Publication Data
US 2019/0322438 A1    Oct. 24, 2019

(30) Foreign Application Priority Data
Jan. 16, 2017   (EP) .................................... 17151656

(51) Int. Cl.
*B65D 85/804* (2006.01)
*A47J 31/00* (2006.01)
(Continued)

(52) U.S. Cl.
CPC ........ *B65D 85/8055* (2020.05); *A47J 31/002* (2013.01); *A47J 31/369* (2013.01); *B65D 81/3294* (2013.01); *B65D 85/8052* (2020.05)

(58) Field of Classification Search
CPC .............. B65D 81/3227; B65D 85/808; B65D 81/3294; B65D 85/8052; B65D 85/8055;
(Continued)

(56) References Cited

U.S. PATENT DOCUMENTS

| 7,685,930 B2 | 3/2010 | Mandralis et al. |
| 2010/0068361 A1* | 3/2010 | Bongers ............. B65D 85/8055 426/431 |

(Continued)

FOREIGN PATENT DOCUMENTS

| WO | 2006021405 | 3/2006 |
| WO | 2006137737 | 12/2006 |

(Continued)

*Primary Examiner* — Anthony D Stashick
*Assistant Examiner* — L Kmet
(74) *Attorney, Agent, or Firm* — K&L Gates LLP

(57) ABSTRACT

The invention relates to a cartridge (1) for preparation of a beverage upon injection of liquid into the cartridge, the cartridge comprising at least a first compartment (2) and a second compartment (3) for holding beverage ingredients, an injection area (4) for receiving a liquid injected into the cartridge, and flow dividing means (8) designed for providing a fluid communication between the injection area (4) and the first and second compartment (2, 3), wherein the flow dividing means (8) are designed to provide a preferred flow path for liquid from the injection area (4) to the first and second compartment [2, 3] and to outlet means (9, 10) of the cartridge.

12 Claims, 14 Drawing Sheets

(51) Int. Cl.
*A47J 31/36* (2006.01)
*B65D 81/32* (2006.01)

(58) Field of Classification Search
CPC ....... B01D 24/008; A47J 31/06; A47J 31/369; A47J 31/002
See application file for complete search history.

(56) References Cited

U.S. PATENT DOCUMENTS

2014/0255564 A1    9/2014  Rondelli
2017/0197779 A1*   7/2017  Bolzicco .............. B65D 65/466

FOREIGN PATENT DOCUMENTS

WO    2012121597    9/2012
WO    2015022191    2/2015
WO    2015062703    5/2015

* cited by examiner

US 11,780,669 B2

CARTRIDGE AND MACHINE FOR MULTI-COMPONENT BEVERAGE PREPARATION

CROSS REFERENCE TO RELATED APPLICATIONS

The present application is a National Stage of International Application No. PCT/EP2018/050909, filed on Jan. 15, 2018, which claims priority to European Patent Application No. 17151656.0, filed on Jan. 16, 2017, the entire contents of which are being incorporated herein by reference.

FIELD OF THE INVENTION

The present invention relates to a cartridge for being extracted under pressure and containing a substance for the preparation of a food product such as a beverage. The invention particularly relates to a cartridge for preparing multi-component beverages in a convenient and facilitated way. The invention further relates to a beverage preparation machine for cooperation with such cartridge.

BACKGROUND OF THE INVENTION

Cartridges designed to be extracted under pressure and containing a substance for the preparation of a beverage are well known. The principle of extracting and/or dissolving the contents of a closed cartridge under pressure typically consists of confining the cartridge in a receptacle of a beverage preparation machine, injecting a quantity of pressurized water into the cartridge, generally after piercing a face of the cartridge with a piercing injection element such as a fluid injection needle mounted on the machine, so as to create a pressurized environment inside the cartridge either to extract the substance or dissolve it, and then release the extracted substance or the dissolved substance through the cartridge. A release of the extracted or dissolved substance is usually obtained by opening an outlet face of the cartridge against a supporting part of the beverage preparation machine comprising raised elements under the effect of the pressure of the fluid entering the cartridge. Cartridges allowing the application of this principle have already been described for example in European patent application EP 0 512 468.

These known cartridges are intended for containing solely a single type of beverage ingredient for being extracted and thus do not enable the preparation of multi-component or multi-phase beverages, whereby two liquid portions coming from two different ingredients are dispensed at different times, for example, to produce a beverage with a milk phase and a coffee phase.

EP 1 785 369 relates to a cartridge for preparing a multi-component beverage such as a cappuccino beverage. The cartridge comprises a first and second compartment with different beverage ingredients, wherein these compartments are separated by a wall that dissolves when exposed to the liquid introduced into the cartridge. The wall is for example made from hard candy or polysaccharides and arranged to surround and include a bulk of beverage ingredients.

This known arrangement suffers the disadvantage of increased complexity and manufacturing costs for the cartridges and their filling. Further, no reliable delay in release of the first and second beverage component from the cartridge is obtainable. Therefore, an enhanced cartridge is sought-after which obviates the drawbacks of the prior art. In particular, a cartridge and a beverage preparation machine for use with such cartridge are sought-after, which provide a convenient and reliable preparation of multi-component or multi-phase beverages with a single cartridge.

The present invention seeks to address the above-described problem. The invention also aims at other objects and particularly the solution of other problems as will appear in the rest of the present description.

SUMMARY OF THE INVENTION

The invention relates in a main aspect to a cartridge for preparation of a beverage upon injection of liquid into the cartridge, the cartridge comprising at least a first compartment and a second compartment for holding beverage ingredients, an injection area for receiving a liquid injected into the cartridge, and flow dividing means designed for providing a fluid communication between the injection area and the at least first and second compartments, wherein the flow dividing means are designed to provide a preferred flow path for liquid from the injection area to the first and second compartment and to outlet means of the cartridge.

The at least first and second compartments are preferably designed to hold different beverage ingredients for preparing different beverage components of the resulting beverage prepared by means of injection liquid into the cartridge. Possible beverage ingredients are any ingredients which are suitable for preparing of a food product and preferably a beverage upon interaction with liquid such as water, e.g. by means of extraction or dissolution. The beverage ingredients may for example encompass soluble coffee powder or ground coffee, soluble milk powder, tea leaves or the like. The first and second compartment may as well hold the same beverage ingredients in different form such as particulate roast and ground coffee of same or different grain size, or roast and ground coffee in one compartment and powdered soluble coffee in another.

For preparing a multi-component beverage such as e.g. cappuccino or latte macchiato, the cartridge may comprise soluble milk in one compartment and soluble coffee or ground coffee in another compartment. Thereby, the provision of a preferred flow path within the cartridge leads to the injected liquid interacting preferably with a first of the provided beverage ingredients in order to prepare a first beverage component, which is thus ejected first form the cartridge. The term "preferred flow path" relates to a flow path within the cartridge interior that provides a relatively lower flow resistance for liquid towards the outlet means of the cartridge than alternative flow paths within the cartridge. A liquid injected into the cartridge will thus preferably follow this flow path towards the outlet means of the cartridge. The interaction of the at least second beverage ingredients with the injected liquid in order to prepare a second beverage component will then predominantly take place after the preparation of the first beverage component.

The flow dividing means are preferably designed to provide a relatively higher flow resistance in the flow path between the injection area and the second compartment than in the flow path between the injection area and the first compartment.

The flow dividing means are preferably designed to selectively close-off the preferred flow path during the beverage preparation process. Thereby, the flow dividing means may be designed to selectively close-off the preferred flow path upon engagement with a dedicated engagement member of a beverage preparation machine. The flow dividing means may as well be designed to close-off the preferred flow path, by actuation under the effect of a predetermined parameter. In particular after a predefined amount of liquid has been injected into the cartridge, or alternatively, after a certain predetermined temperature is reached inside the capsule due to injection of how water therein. The flow dividing means may as well be designed to undergo a deformation dependent on the pressure injected into the cartridge.

The cartridge interior is preferably divided such as to provide the at least first and second compartments. For this purpose, the cartridge interior preferably comprises wall means that separate the cartridge into different compartments. The wall means preferably comprise at least a first and more preferably also a second wall means for separating the interior of the cartridge into the at least first and second compartments. The wall means may be essentially cylindrically shaped.

The compartments preferably extend vertically within the cartridge. Preferably, the compartments may extend vertically from the flow dividing means to a lower portion of the cartridge. The compartments are preferably arranged concentrically within the cartridge. The cartridge may as well comprise more than the mentioned first and second compartments and may particularly comprise at least a third compartment.

The cartridge is preferably an essentially rigid cartridge. The cartridge preferably comprises an essentially rigid body to which an inlet face is connected. The body is preferably of essentially W-shaped form when seen in sectional side view. The body may be also of essentially cup-shaped form. The inlet face is preferably connected to a flange-like rim of the body, e.g. by means of adhesive or welding. The rigid body is preferably made from plastic material such as e.g. by injection molding. The inlet face may be formed by means of a piercable or tearable membrane. The membrane is preferably made from aluminum or aluminum plastic composite material. Accordingly, an injection member of a beverage preparation machine may be made to perforate or pierce the inlet face and inject liquid into the cartridge interior. The inlet face is preferably deformable and/or elastic. Accordingly, an engagement member of a beverage preparation machine may be made to extend at least partially into the cartridge interior upon at least a partial deformation of the inlet face.

The injection area is preferably a space within the cartridge interior that is designed to receive an injection means such as e.g. a piercing or needle element for injecting liquid into the cartridge. The injection area is preferably in fluid connection with all compartments of the cartridge. The injection area is preferably situated between the inlet face and the flow dividing means.

The flow dividing means are preferably arranged essentially in parallel to the inlet face and/or to the flange like rim of the cartridge.

According to the principle of the invention, the flow dividing means is an essentially disc-shaped member comprising a central aperture surrounded by a perforated area. The perforated area is preferably a ring-shaped area.

Also according to the principle of the invention, the central aperture is in fluid communication with the first compartment and the perforated area is preferably in fluid communication with the second compartment. The flow dividing means preferably comprise an engagement portion that is arranged between the central aperture and the perforated area. The engagement portion is preferably designed to be engaged by a dedicated engagement member of a beverage preparation machine to be used in conjunction with the cartridge in order to selectively close-off a flow path between the injection area and the first compartment. The engagement portion may be a protruding lip or ring that encompasses the central aperture.

The perforated area preferably comprises a plurality of apertures or holes, typically between 50 to 120, more preferably between 70 to 90 apertures or holes. The apertures or holes preferably each have a diameter of between 0.2 to 1.2 mm, more preferably between 0.3 to 0.8 mm. The central aperture is preferably a circular aperture or hole with a diameter of between 5 to 30 mm, more preferably between 10 to 20 mm.

In a preferred embodiment, the outlet means of the cartridge comprise a first outlet in fluid communication with the first compartment and a second outlet in fluid communication with the second compartment. The first and second outlets are preferably each covered by means of a piercable or a tearable membrane. The first and second outlets are preferably vertically and/or horizontally spaced apart from each other.

The first outlet preferably comprises a central outlet duct of the cartridge. The membrane of the first outlet is preferably arranged to cover said central outlet. The membrane is preferably designed for being torn under the effect of rising pressure within the cartridge and in particular within the first compartment thereof. This may be obtained by the membrane reaching its breaking stress and/or by dedicated opening means against which the membrane is urged with increasing pressure.

The second outlet is preferably arranged radially outside to the first outlet. The second outlet is preferably arranged concentrically to the first outlet. The second outlet preferably comprises a ring-shaped aperture in a lower portion of the cartridge body that is covered by a ring-shaped membrane. The membrane is preferably designed for being torn under the effect of rising pressure within the cartridge and in particular within the second compartment thereof. This may be obtained by the membrane reaching its breaking stress and/or by dedicated opening means against which the membrane is urged with increasing pressure.

The opening means for the membrane covering the second outlet may be provided by a beverage preparation machine and/or a cartridge support of such machine as will be further described below. In an alternative embodiment, the cartridge may comprise its own opening means for the membrane of the second outlet. For this purpose, the cartridge may comprise an opening plate with dedicated opening elements, which is integrally formed with the cartridge or attached thereto. The opening elements are preferably arranged to open the membrane of the second outlet upon pressure increase within the cartridge interior.

In a preferred embodiment, the outlet membrane of the second outlet preferably comprises a larger thickness than the outlet membrane of the first outlet. Accordingly, the required force for opening the first outlet is smaller compared to the force required for opening the second outlet.

The membrane covering the first outlet and the ring-shaped membrane covering the second outlet are preferably constituted by a thin film. The membranes are preferably made from aluminum or aluminum plastic composite material.

The cartridge may further comprise a reinforcement member designed to at least partially strengthen the cartridge. The reinforcement member is preferably arranged at least within one of the compartments of the cartridge. The reinforcement member may be conformably shaped to the outer walls of the respective compartment. In a preferred embodiment, the reinforcement member is a central reinforcement cone or cylinder that is situated in the first compartment of the cartridge. The reinforcement member may as well be designed to at least partially open an outlet membrane of the cartridge, in particular the membrane covering the first outlet during use of the cartridge with a dedicated beverage preparation machine.

In a further aspect, the invention involves a beverage preparation machine for preparing a beverage by injection of liquid into a cartridge, the machine comprising an injection head and a cartridge support for receiving the cartridge in the machine, the injection head comprising a liquid supply means for providing liquid to the cartridge and an engagement member which is arranged movable with respect to an inlet face of the cartridge when held in the cartridge support, wherein the engagement member is designed to selectively protrude at least partially into the cartridge interior in order to engage with a flow dividing means of the cartridge and to close-off a flow path within the cartridge. The flow path closed-off by the engagement member is preferably a preferred flow path for liquid injected into the cartridge.

The machine enables the preparation of multi-component beverages in a convenient and effective manner with a single cartridge only. The machine is preferably designed to first inject liquid into the cartridge in order to interact with a first beverage ingredient of the cartridge, then to engage the flow dividing means of the cartridge to close-off a liquid flow path within the cartridge and to subsequently inject liquid into the cartridge in order to interact with at least a second beverage ingredient of the cartridge. The machine may be designed to continuously or intermittently inject liquid into the cartridge during the beverage preparation process.

The machine preferably comprises a liquid supply unit connected to the liquid supply means of the injection head. The supply unit may comprise a liquid reservoir and a liquid pump. The liquid supply unit may further comprise heating means for heating the liquid provided to the cartridge. The heating means may comprise a thermoblock and/or a boiler. The machine is preferably designed for injecting heated and/or pressurized liquid into the cartridge. The liquid provided to the cartridge is preferably water.

The engagement member of the injection is preferably designed to assume at least a first and a second cartridge engagement position for contacting the inlet face of the cartridge and for injecting liquid into the cartridge. In the first and second cartridge engagement positions, the engagement member preferably assumes a different vertical position with respect to the inlet face of the cartridge. The engagement member is preferably able to be lowered onto the inlet face of the cartridge for being brought into the respective positions. For this purpose, the injection head preferably comprises actuating means for moving the engagement member in the respective positions. The actuating means may comprise a cylinder drive or a spindle drive.

The engagement member is preferably further designed for assuming a cartridge insertion position in which the engagement member is arranged distant to the inlet face of the cartridge.

The engagement member preferably comprises a radial lip for sealing about an injection member of the liquid supply means. The radial lip may be arranged to seal locally, i.e. directly adjacent about the injection member, or distant to the injection member.

The engagement member is preferably made from a deformable and/or resilient material. The engagement member is preferably made from rubber material. A lower face of the engagement member for engaging the flow dividing means of the cartridge is preferably planar.

The engagement member may comprise a central engagement plate with a lower planar surface. The engagement plate may be formed integral to the engagement member or as a separate member movable with respect thereto. In the latter case, the central engagement plate may be designed for being moved independent from the rest of the engagement member. Thereby, the engagement plate is preferably movable with respect to the engagement member such as to protrude from a lower face thereof. For this purpose, the machine and/or the engagement member may comprise additional drive means connected to the engagement plate.

The cartridge support of the machine may comprise a movable and/or detachable cartridge holder for receiving a cartridge therein. The cartridge support preferably comprises a recess for supporting the cartridge and opening means for opening an outlet face of the cartridge upon pressure increase within the cartridge interior. The cartridge support preferably further comprises a central opening for receiving outlet means of the cartridge and/or a central positioning member of the opening means.

The opening means of the cartridge support are preferably designed for opening a membrane covering a second outlet of the cartridge. The opening means is preferably a ring-shaped or disc-shaped plate with protruding opening elements arranged on an upper surface thereof. The opening means preferably comprise a central aperture in which a first outlet of the cartridge may be received. The opening means may further comprise support elements that engage with at least part of a lower face of the cartridge and support the cartridge during beverage extraction therefrom.

The opening means may be integrated into the cartridge support or may be formed as separate part to the cartridge support. In the latter case, the opening means are preferably designed as being selectively connectable to the cartridge support. For this purpose, the opening means and/or the cartridge support may comprise dedicated connection means such as interacting latches, hooks, protrusions and/or recesses and the like for enabling a selective connection between these parts.

The cartridge support may be designed for being selectively connected to differently shaped opening means. The respective opening means may differ in the embodiment of opening elements and/or a central guiding channel thereof. The different opening means may as well be formed of different material such as e.g. different plastic and/or metallic materials.

In a further aspect, the invention relates to a system comprising the beverage preparation machine and a cartridge as described above.

The system may comprise a plurality of cartridges with different beverage ingredients held therein.

In a preferred embodiment, the system may further comprise a sealing ring for being selectively placed onto the cartridge when placed into the cartridge support of the machine.

The sealing ring is preferably designed for being situated between the inlet face of the cartridge and the engagement member of the injection head of the machine in order to support the fluid-tightness during beverage preparation. The sealing ring is preferably of deformable and/or elastic material. The sealing ring is preferably made from rubber material.

In a further aspect, the invention relates to a method for preparing a multi-phase or multi-component beverage by means of a single cartridge, the method comprising the steps of:

injecting a liquid into the cartridge in order to prepare a first beverage component from beverage ingredients provided in a first compartment of the cartridge, engaging a flow dividing means situated within the cartridge interior in order to close-off a flow path to the first compartment, injecting liquid into the cartridge in order to prepare a second beverage component from beverage ingredients provided in a second compartment of the cartridge.

In a preferred embodiment, the method further comprises the step of providing a preferred flow path for liquid injected to the cartridge from an injection area in the cartridge interior to the first and second compartment and to outlet means of the cartridge before the step of engaging the flow dividing means.

The method may further comprise the step of ejecting the resulting beverage component from the first compartment from a first outlet and ejecting the resulting beverage component from the second compartment from a second outlet of the cartridge.

It is noted that the above described features of the cartridge and the machine are also applicable to the method according to the invention. In particular, the machine and the cartridge according to the invention may be utilized for carrying out the method according to the invention.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
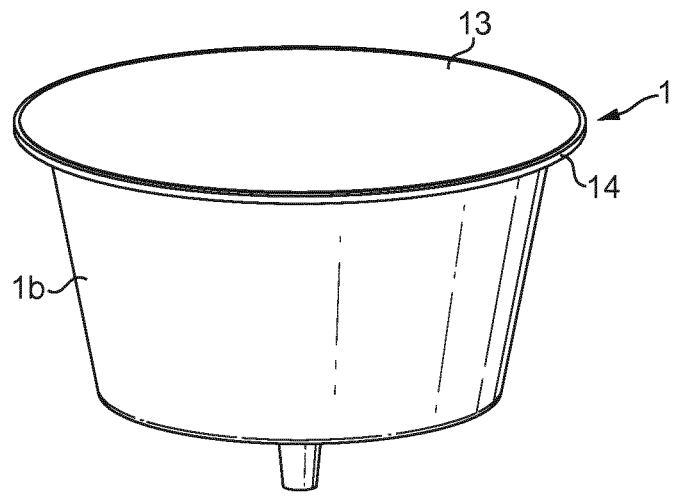
FIGS. 1A and 1B are perspective side views of a preferred embodiment of the cartridge according to the invention.
Figure 1B:
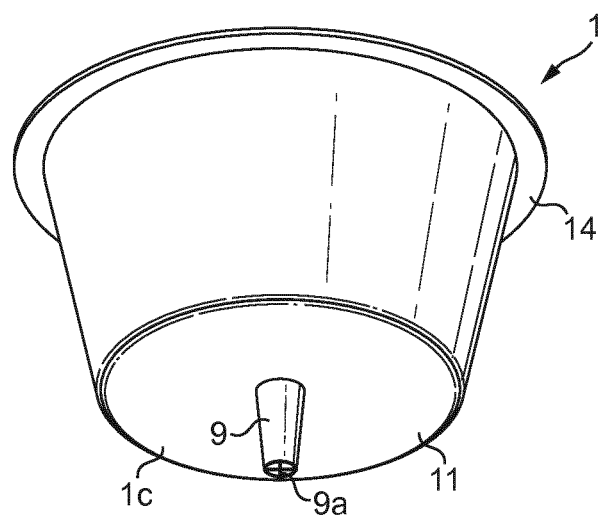

FIGS. 1A and 1B relate to a preferred embodiment of the cartridge 1 according to the invention. The cartridge 1 comprises a body 1b with a flange-like rim 14. An inlet face 13 is connected to the flange-like rim preferably by means of adhesive or a welding technique. The cartridge body 1b may be of essentially W-shape when seen in sectional side view. The cartridge body may as well be of essentially cup-shaped form. The inlet face 13 is preferably of essentially planar shape and may be made from a tearable or pierceable material such as aluminum and designed to enable a liquid injection member 23a to perforate the inlet face 13 and inject liquid into the cartridge.

The cartridge 1 further comprises outlet means 9, 10 for enabling the discharge of beverage from the cartridge. The outlet means preferably comprise a first outlet 9 which projects from a lower bottom portion 1c of the cartridge in the form of an outlet duct. The first outlet 9 is preferably arranged in the center of the bottom portion 1c of the cartridge. The lower end of first outlet 9 preferably comprises four outlet apertures 9a that are in fluid connection with the interior 1a of the cartridge 1 and in particular with a first compartment 2 thereof.

The cartridge 1 further comprises a second outlet 10 arranged distant to the first outlet. The second outlet 10 is preferably arranged radially outside to the first outlet 9. The second outlet is preferably of ring-shaped form and arranged to surround the first outlet 9. The second outlet 10 is preferably a ring-shaped aperture that is covered by a tearable or pierceable ring-shaped membrane 11. The membrane 11 is preferably connected to a circumferential outer wall portion of the lower bottom portion 1c. The membrane 11 may be connected via adhesive or welding to the capsule body 1b. The outlet 10 is in fluid connection with the interior 1a of the cartridge 1 and in particular with a second compartment 3 thereof.

Figures 2A, 2B:
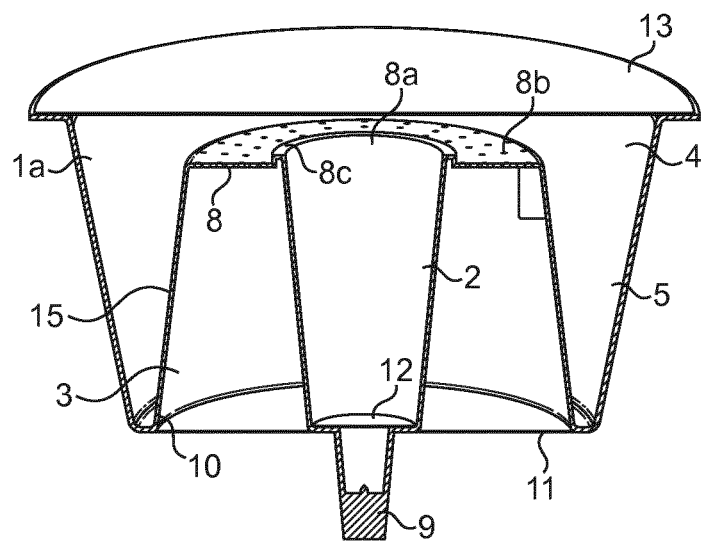
FIGS. 2A and 2B are sectional side views of the cartridge according to FIGS. 1a and 1b.

As shown in FIGS. 2A and 2B, the cartridge 1 comprises an interior 1a which is divided in at least a first compartment 2 and a second compartment 3 for holding beverage ingredients. The cartridge 1 may additionally comprises at least a third compartment 5. The respective compartments 2, 3, 5 are preferably arranged to extend vertically within the cartridge. The compartments 2, 3, 5 are preferably concentrically arranged within the cartridge interior 1a.

The cartridge 1 comprises wall means 15 between the respective compartments 2, 3, 5. The wall means 15 are preferably integrally formed with the cartridge body 1b. The wall means 15 are thus preferably formed by means of injection molding.

The cartridge 1 further comprises an injection area 4 for receiving a liquid injection member 23a for injecting liquid into the cartridge. The injection area 4 is preferably in fluid communication with at least the first and second compartment 2, 3. The injection area 4 is preferably formed by a free space below the inlet face 13 of the cartridge. The injection area 4 may at least be partially formed by means of a third compartment 5 of the cartridge.

The cartridge 1 further comprises flow dividing means 8 designed for providing a fluid communication between the injection area 4 and the at least first and second compartments 2, 3. The flow dividing means 8 are designed to provide a preferred flow path for liquid from the injection area 4 to the first and second compartment 2, 3 and to the outlet means 9, 10 of the cartridge. The flow dividing means 8 are preferably integrally formed with the separating wall means 15 of the cartridge. The flow dividing means 8 may thus also be formed by means of the same injection forming process when manufacturing the cartridge body 1b.

The flow dividing means 8 are preferably arranged in parallel to the upper inlet face 13 and/or a flange like rim 14 of the cartridge 1. Thereby, the flow dividing means 8 may be an essentially disc-shaped member comprising a central aperture 8a surrounded by a perforated area 8b. The central aperture 8a comprises a relatively large opening for allowing liquid to pass from the injection area 4 into the first compartment. The perforated area 8b comprises a plurality of openings for allowing liquid to pass from the injection area 4 into the second compartment. The opening 8a and the perforations 8b are chosen in their diameter and shape such as to provide a relatively higher flow resistance in the flow path between the injection area 4 and the second compartment 3 than in the flow path between the injection area 4 and the first compartment 2.

The flow dividing means 8 preferably further comprise a circular engagement portion 8c arranged between the central aperture 8a and the perforated area 8b. The circular engagement portion 8c is preferably a protruding ring integrally formed with the flow dividing means 8.

As shown in FIG. 2B, the first compartment 2 may be filled with soluble milk powder. The second compartment 3 may be filled with soluble coffee or ground coffee. A third compartment 5 may also be filled with soluble milk powder. The third compartment is preferably void of any outflow means directly connected to this compartment. This means that liquid may only be ejected from the third compartment 5 by passing through the first or second compartment 2, 3.

Figure 3:
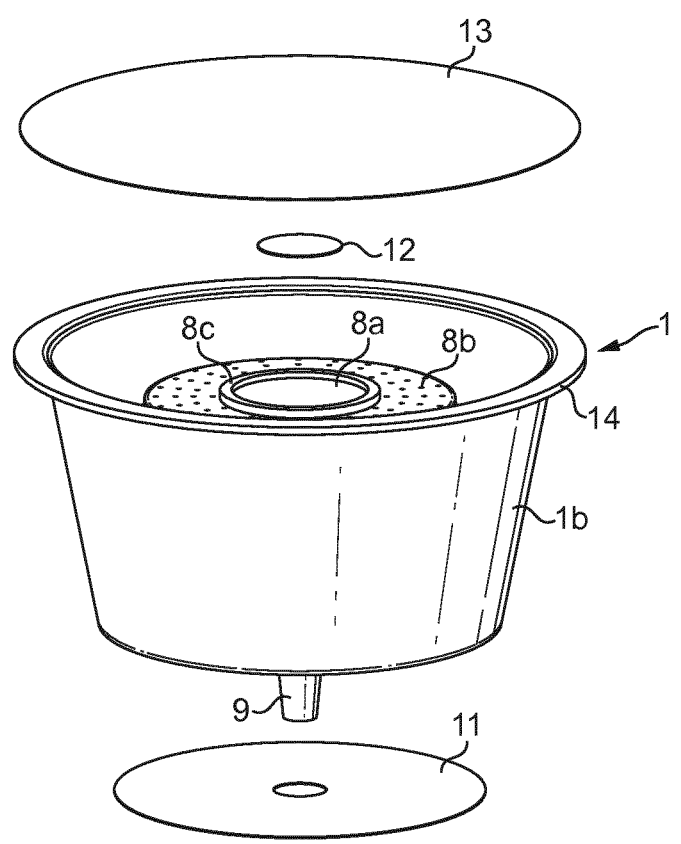
FIG. 3 is an exploded assembly drawing of the cartridge according to FIGS. 1 and 1b.

As shown in FIG. 3, a tearable or pierceable membrane 12 is arranged at a bottom region of the first compartment 2 such as to close-off the flow path between the first compartment 2 and the first outlet means 9. The membrane 12 may be connected to a circumferential support portion at the bottom region of the first compartment or within the outlet duct 9.

Figure 4:
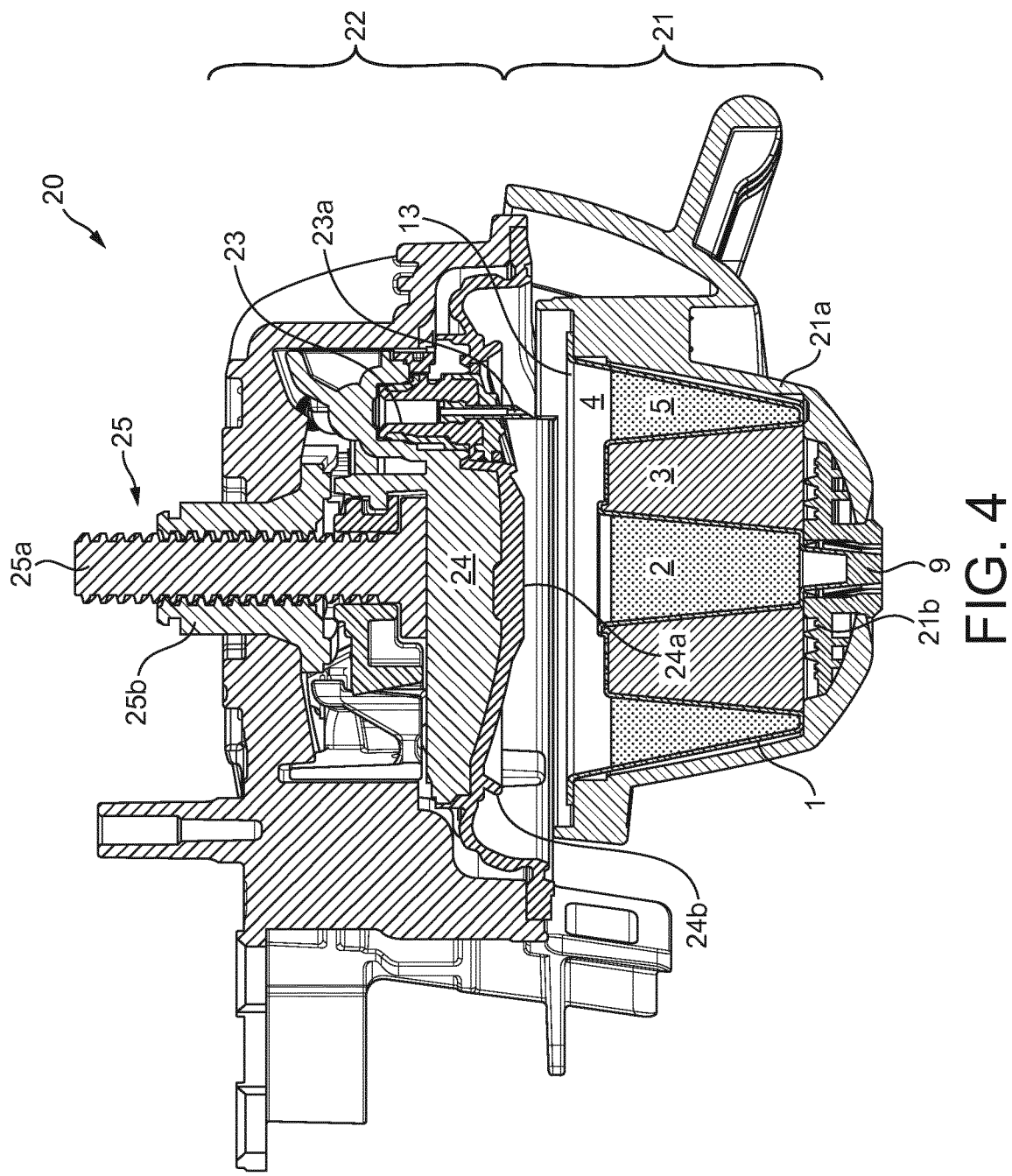
FIG. 4 relates to a preferred embodiment of an injection head of the beverage preparation machine according to the invention.

FIG. 4 relates to a preferred embodiment of a beverage preparation machine 20 according to the present invention. Notably, as cartridge-based beverage preparation machines are well known in the present field, it is referred in the following in particular to the main aspects of the invention. Thereby, it should be understood that the machine 20 according to the invention is designed for providing a heated and/or pressurized liquid such as water to a cartridge 1. For this purpose, the machine 20 preferably comprises a liquid supply unit (not shown) connected to liquid supply means 23 of an injection head 22 of the machine. The supply unit may comprise a liquid reservoir (not shown) and a liquid pump (not shown). The liquid supply unit may further comprise heating means (not shown) for heating the liquid provided to the cartridge 1. The machine may further comprise a user interface for selectively starting and/or stopping the beverage preparation process.

The machine 20 preferably comprises an injection head 22 and a cartridge support 21 for receiving the cartridge 1 in the machine. The injection head 22 comprises a liquid supply means 23 for providing liquid to the cartridge 1 and an engagement member 24 that is arranged movable with respect to an inlet face 13 of the cartridge 1 when held in the cartridge support 21.

The cartridge support 21 may be a cartridge holder that is arranged movable with respect to the injection head 22. The cartridge holder may be configured as being detachable from the injection head 22.

The injection head 22 preferably comprises drive means 25 for selectively moving the movable engagement member 24 with respect to the cartridge support 21, a cartridge 1 held therein and in particular with respect to an inlet face 13 thereof. The drive means 25 is preferably a rotational drive such as a spindle drive in which a central axis 25a is moved axially in a surrounding cylindrical support 25b upon rotation.

The engagement member 24 preferably comprises a radial lip 24b for sealing about the liquid injection member 23a of the liquid supply means 23. The radial lip 24b is preferably a deformable element that protrudes from a lower face of the engagement member 24.

The liquid injection member 23a is preferably a hollow needle element. The liquid injection element 23 may be integrally formed with the engagement member 24 or fixedly connected thereto.

The engagement member 24 preferably comprises a central engagement plate 24a with a lower planar surface. The engagement plate 24a is preferably integral to the engagement member 24 or a separate member movable with respect thereto.

The cartridge support 21 comprises a recess 21a for supporting the cartridge 1 and opening means 21b for opening an outlet face 11 of the cartridge 1 upon pressure increase within the cartridge interior.

Figure 5A:
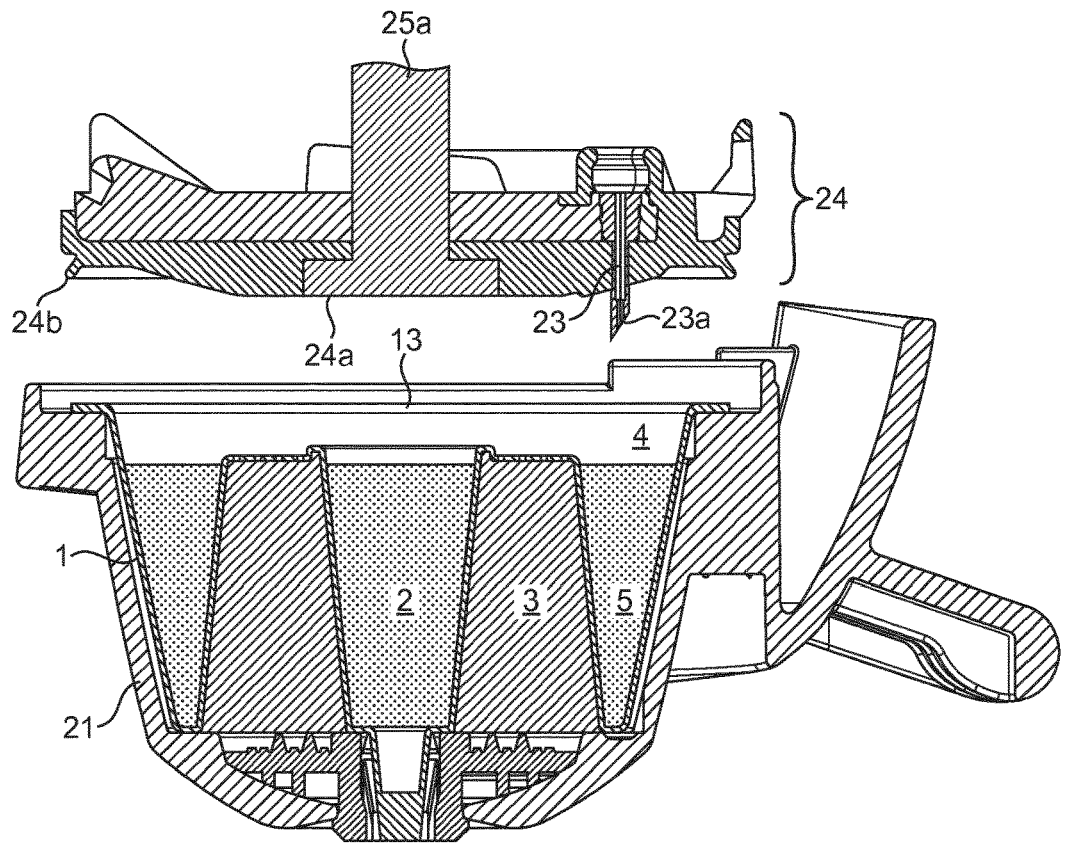
FIGS. 5A to 5C illustrate preferred different positions of an engagement member of the injection head of the machine according to the invention.
Figure 5B:
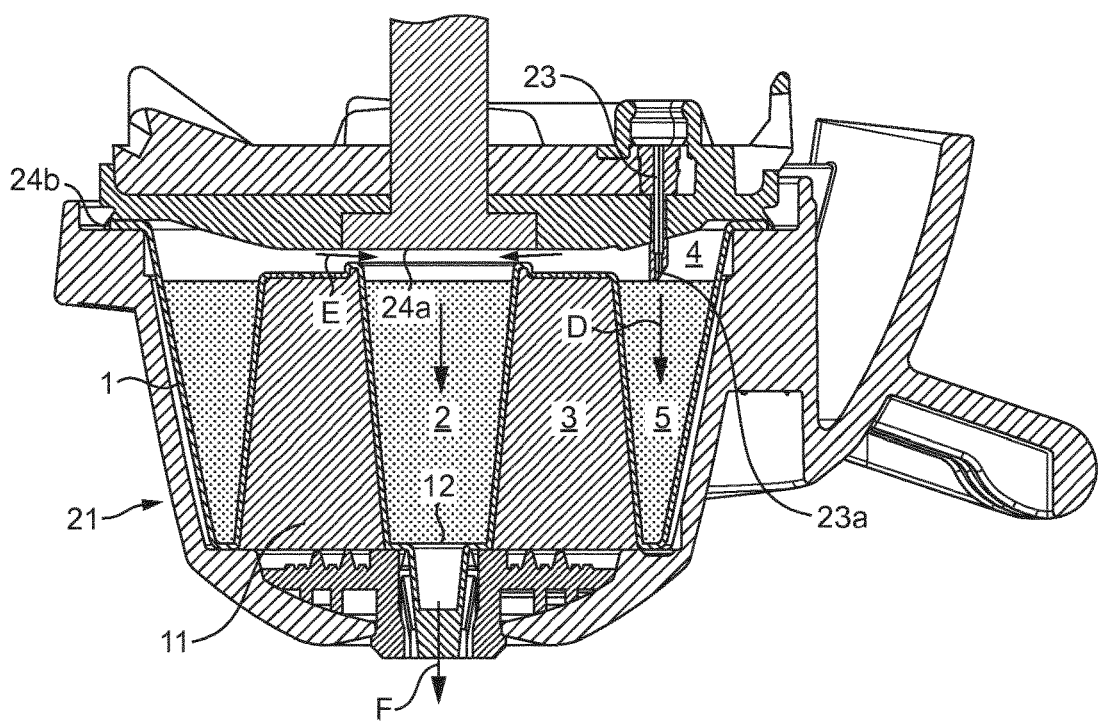
Figure 5C:
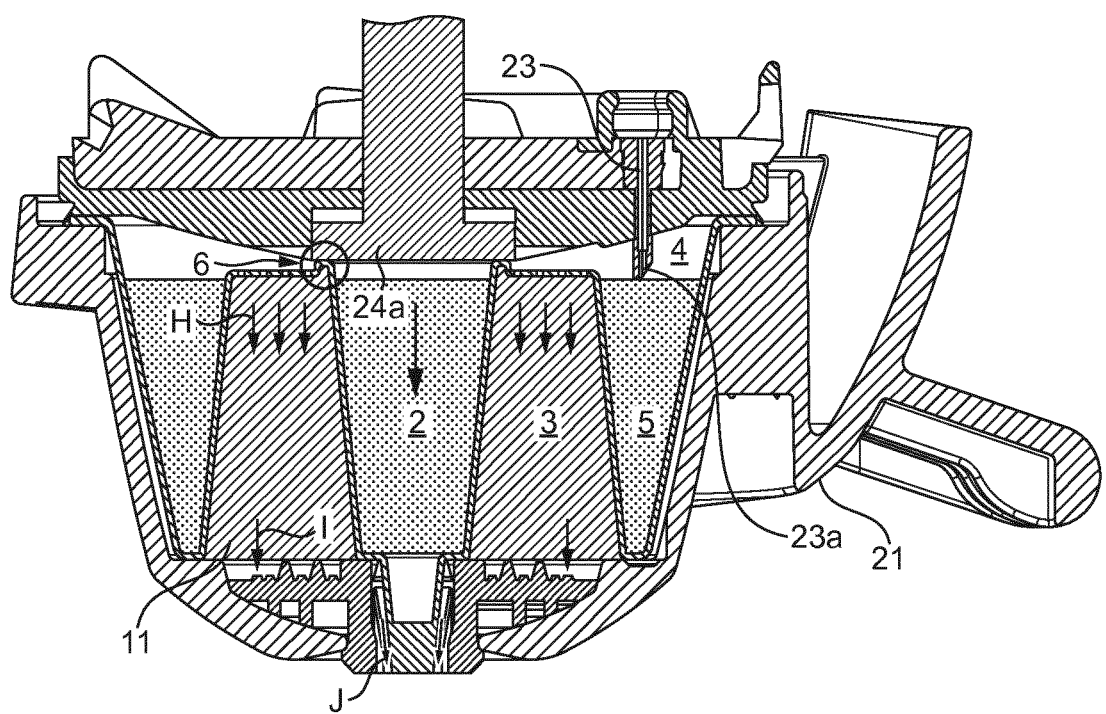

FIGS. 5A to 5C illustrate the injection process into the cartridge 1 during beverage preparation. Thereby, FIG. 5a relates to an initial cartridge insertion position A of the engagement member 24 with respect to the cartridge 1 held within the support 21. As the engagement member 24 is kept distant to the cartridge 1 in this position, the cartridge 1 may be inserted into injection head 22 in this position.

FIG. 5B relates to a first cartridge engagement position B in which the engagement member 24 is lowered onto the inlet face 13 of the cartridge 1. This is preferably obtained by actuating the drive means 25 of the injection head 22, which leads to a preferably vertical displacement of the engagement member 24 within the injection head 22. Thereby, the liquid injection member 23a protruding from a lower face of the engagement member 24 is made to pierce the inlet face 13 of the cartridge. The radial lip 24b is pressed onto an outer circumferential area of the inlet face 13 and/or into a receiving area of the cartridge support 21 such as to seal about the circumference of the injection member 23a during liquid injection. The radial lip 24b is preferably deformable such as to smoothly contact the upper surface of the inlet face 13 and/or a receiving area of the cartridge support 21.

In this position B, the engagement plate 24a arranged at a central lower part of the engagement member 24 engages with a central part of the inlet face 13. Thereby, the engagement member 24 may slightly urge the inlet face 13 downwards to a predefined extent. In this position, the engagement plate 24a may at least partially protrude into the interior of the cartridge 1. The position of the engagement member 24 is chosen such that a free space is still provided between the flow dividing means 8 of the cartridge 1 and the lower face of the engagement plate 24a. Accordingly, liquid may still pass between the upper surface of the flow dividing means 8 and the lower surface of the inlet face 13.

Upon injection of liquid into the cartridge as shown in FIG. 5B by arrows D, E, F, the liquid will enter the injection area 4 of the cartridge 1. From the injection area 4 the liquid will then predominantly flow along the provided preferred flow path E from the injection area 4 to the first compartment 2. This is due to the flow dividing means 8 providing a relatively larger flow restriction in the flow path from the injection area 4 to the second compartment 3 than in the flow path from the injection area 4 to the first compartment 2. As the pressure increases within the first compartment 2, the closing membrane 12 of the first outlet 9 will tear upon reaching its breaking stress or due to an interaction with dedicated opening means arranged in the outlet 9. The beverage resulting from the interaction of the injected liquid with the ingredients provided in the first compartment 2 will thus be able to leave the cartridge via the first outlet 9. As the first outlet 9 is in the form of a downwardly protruding outlet duct which is formed to be received by a central aperture of the cartridge support 21, preferably no contact between the ejected beverage component and the cartridge support 21 will take place.

After ejection of the beverage component from the first compartment 2, the engagement means 24 is brought into its second cartridge engagement position C as depicted in FIG. 5C. Therein, the engagement means 24 may be further lowered with respect to the inlet face 13 of the cartridge such that the engagement plate 24a further protrudes into the interior of the cartridge 1 and engages the flow dividing means 8. FIG. 5C shows an embodiment in which the engagement plate 24a is separately movable with respect to the rest of the engagement member 24. It is however also viable that the whole engagement member 24 is further lowered onto the cartridge 1.

As indicated in detail section G, the planar lower face of the engagement plate 24a is thus pressed onto the protruding engagement portion 8c between the central aperture 8a and the perforated area 8b. The preferred flow path E (see FIG. 5b) within the cartridge is closed and the injected liquid will then pass the perforated area 8b as indicated by arrows H. The increase in pressure in the second compartment 3 (arrow I) will then lead to deformation of the membrane 11 against the opening means 21b of the cartridge support 21. The liquid ejected from the cartridge 1 will then flow to a central circular guiding channel 26 of the opening means 21b (arrows J) and will be drained from a lower face of the cartridge support 21.

Figure 6:
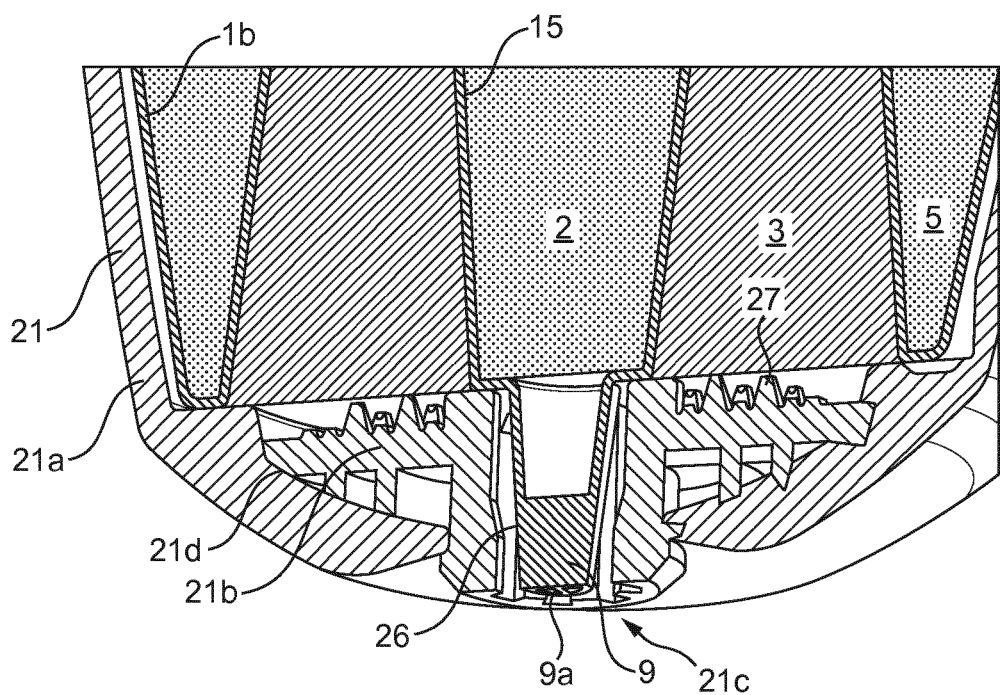
FIG. 6 relates to a sectional side view of a lower portion of the cartridge support of the beverage preparation machine.
Figure 7:
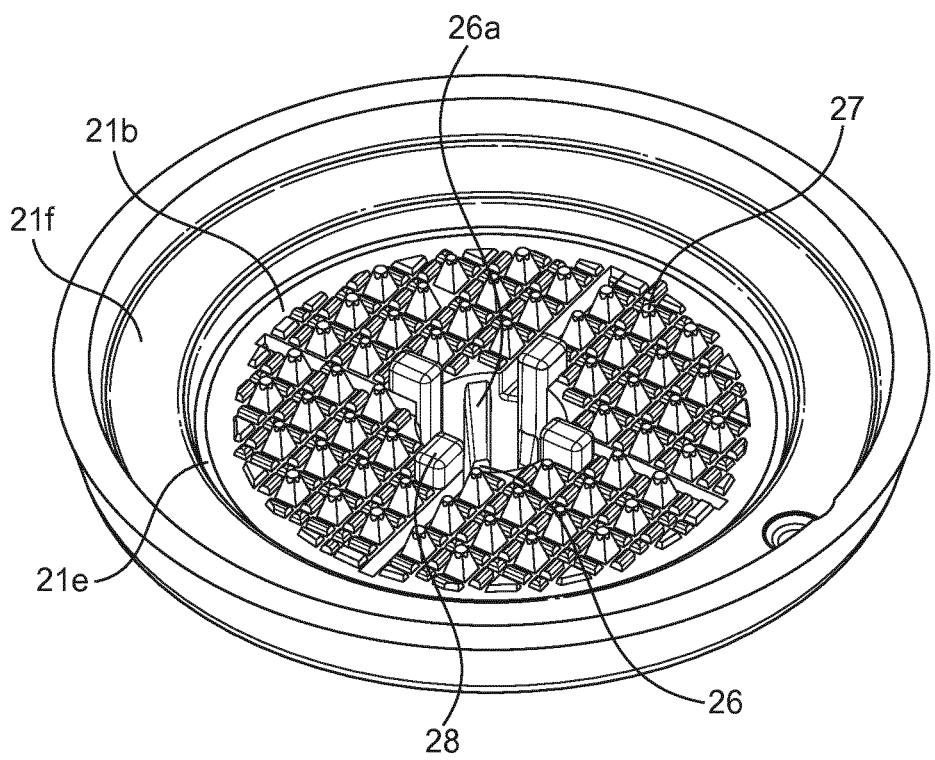
FIG. 7 relates to a perspective side view of a preferred embodiment of the opening means associated to the cartridge support.

FIG. 6 relates to a sectional side view of a lower portion of the cartridge support 21 of the beverage preparation machine 20 in which the opening means 21b are provided and FIG. 7 relates to a perspective side view of a preferred embodiment of the opening means 21b associated to the cartridge support 21.

The opening means 21b may be integrated into the cartridge support 21. Thereby, the opening means 21b and the cartridge support 21 may be formed e.g. from plastic material in an injection moulding process.

Figure 10A:
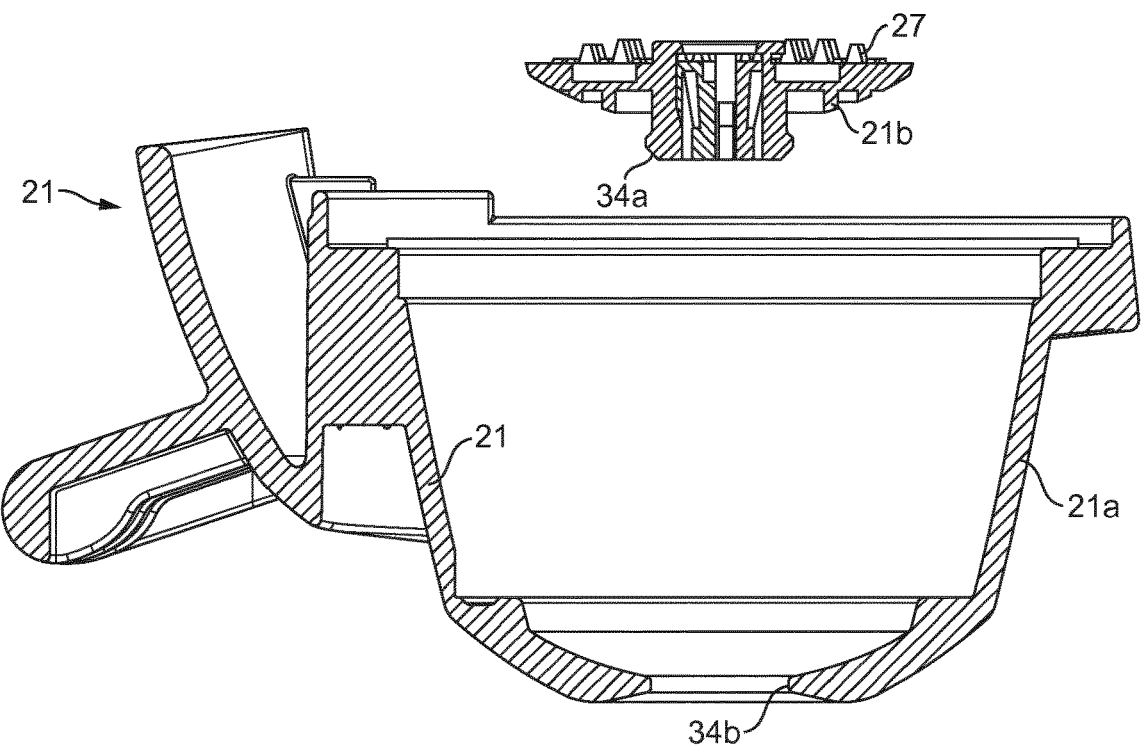
FIGS. 10A and 10B illustrate a preferred embodiment of a cartridge support with exchangeable opening means for being selectively associated therewith.
Figure 10B:
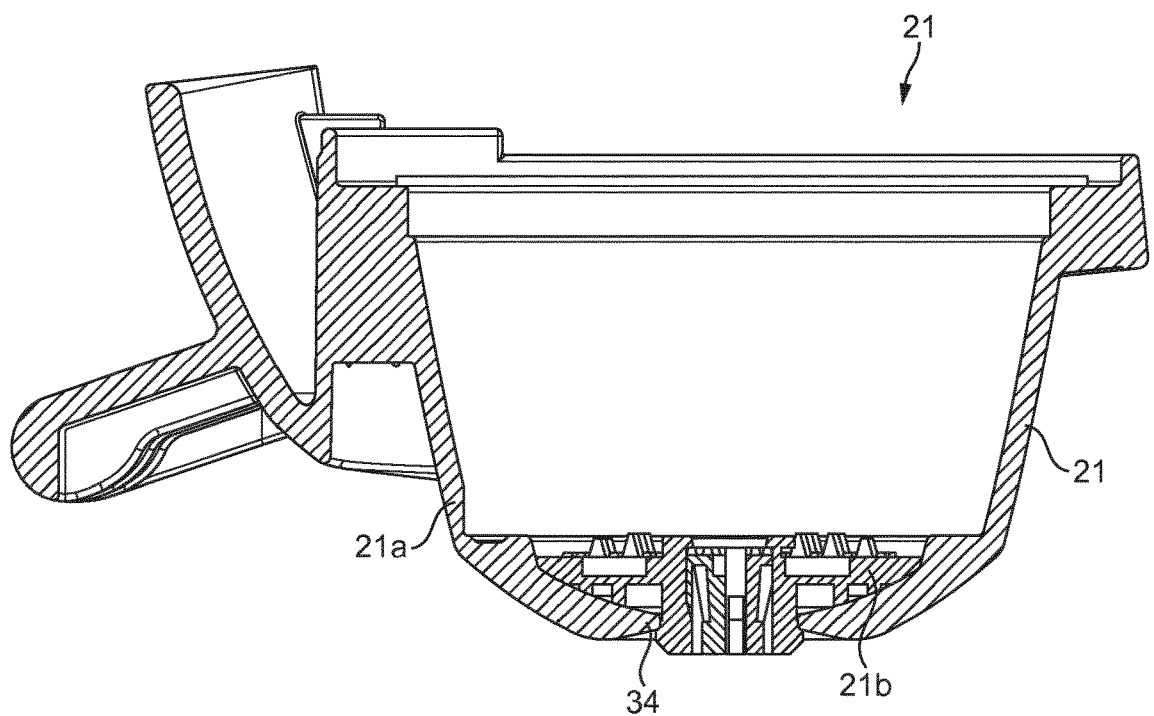

In another preferred embodiment as for example shown in FIGS. 10A and 10B, the opening means 21b may be formed as separate part to the cartridge support 21. Thereby, the opening means 21b are preferably designed as being selectively connectable to the cartridge support 21. The opening means may be designed to be assembled, positioned and/or attached either permanently or removably to the cartridge support 21. For example, the opening means 21b may be clipped, glued, welded, screwed or the like to the cartridge support 21. The opening means 21b and/or the cartridge support 21 may as well comprise dedicated connection means 34a, 34b such as interacting latches, hooks, protrusions and/or recesses and the like for enabling a selective connection between these parts. As shown in FIGS. 10a and 10b, the connection means 34 may comprise a protruding annular lip 34a of the opening means 21b which may selectively be clipped into a lower central receiving aperture 34b of the cartridge support 21.

A system of the cartridge support 21 and the opening means 21b may comprise different forms of the opening means 21b. The system may comprise in particular different opening means 21b to be selectively associated to the cartridge support 21. The respective opening means 21b may be differently shaped. The opening means 21b may in particular differ in the embodiment of the opening elements 27 as described further below. Further, the opening means 21b may be equipped with different guiding channels 26. The opening means 21b may as well be formed of different material such as e.g. different plastic and/or metallic materials.

In a preferred embodiment, the opening means 21b may be an opening plate of essentially disc-shaped or ring-shaped form. The opening plate 21b is preferably rotational symmetric. The opening plate may as well comprise a different geometric form when seen in top view such as e.g. squared, triangular, pentagonal or of another polygonal form. Alternatively or in addition, the opening plate 21b may be designed for being keyed to the cartridge support 21 such as to be inserted in a particular rotational orientation thereto only. For this purpose an outer lateral surface or edge 21e of the opening means 21 may interact with a conformably shaped inner recession of the cartridge support 21.

The opening means 21b preferably comprise a central circular guiding channel 26. The guiding channel 26 is preferably designed such as to receive the outlet duct 9 of the cartridge 1. An outer lateral surface of the guiding channel 26 may act as central positioning member for correctly positioning the opening means 21b within a central aperture in the outlet face 21c of the cartridge support 21. A lower bottom portion of the opening means 21b may be conformably shaped to a receiving recess 21d of the cartridge support 21.

The upper surface of the opening means 21b preferably comprises a plurality of opening elements 27 designed to open the lower outlet membrane 11 of the cartridge.

The opening elements 27 are preferably arranged in close vicinity to the outlet membrane 11 such as to interact with and/or open at least partially the outlet membrane 11 upon pressure increase within the cartridge 1. The opening elements 27 may be blades, points, knives, needles, recessed and raised elements, elements of cone-shape, pyramid-shape or any other geometry. Examples for such opening elements are described in patents EP 1 472 156 B1 and EP 1 808 382 B1.

The opening means 21b may lead to a perforation or puncturing of the lower outlet membrane 11 upon pressure increase within the cartridge. Thereby, the term "perforate" or "puncture" within this application preferably relates to making an opening against a solid, flexible or otherwise, weakened or partially open, portion of the outlet membrane not only by puncturing in the strict sense of the term but also by any equivalent means such as cutting or breaking.

The opening means 21b may as well lead to an opening of the outlet membrane 11 by means of reaching a breaking stress of the membrane upon pressure increase within the cartridge. Thereby, the opening elements 27 may provide a surface that is extended with respect to a flat surface, such that when the lower outlet membrane 11 deforms under the effect of the rise of pressure inside the capsule 1, a surface of the outlet membrane 11 will extend to allow conformation of the membrane 11 to at least part of the opening elements 27, whereby the extension of the membrane surface leads to a reaching of the shear stress limit of the membrane 11 until it ruptures.

Between the protruding opening elements 27, interstices are preferably provided in order to enable a liquid to flow between the elements 27.

The liquid beverage component provided from the second compartment 3 via the outlet membrane 11 to the opening means 21b is preferably collected on the upper surface of the opening means 21b and guided to the central circular guiding channel 26. The guiding channel 26 preferably comprises axially arranged recesses 26a in its lateral surface such as to facilitate the evacuation of the liquid along the outlet duct 9 of the cartridge and towards a lower outlet face 21c of the cartridge support 21.

As shown in FIG. 7, the opening means 21b preferably comprise protruding support elements 28 which are arranged about the circumference of the central circular guiding channel 26 in order to support the lower central bottom portion of the cartridge during beverage preparation. The support elements 28 are preferably of essentially square or rectangular shape when seen in top view. The support elements 28 may however comprise a different geometric form when seen from above. The support elements 28 are preferably arranged to protrude to a larger extent from an upper surface of the opening means 21b than the opening elements 27 thereof. Thereby, the support elements 28 preferably protrude to the same height from the upper surface of the opening means 21b. Further, the support elements 28 are preferably protruding to the same height as an inner annular surface 21f of the cartridge support 21.

Figure 12A:
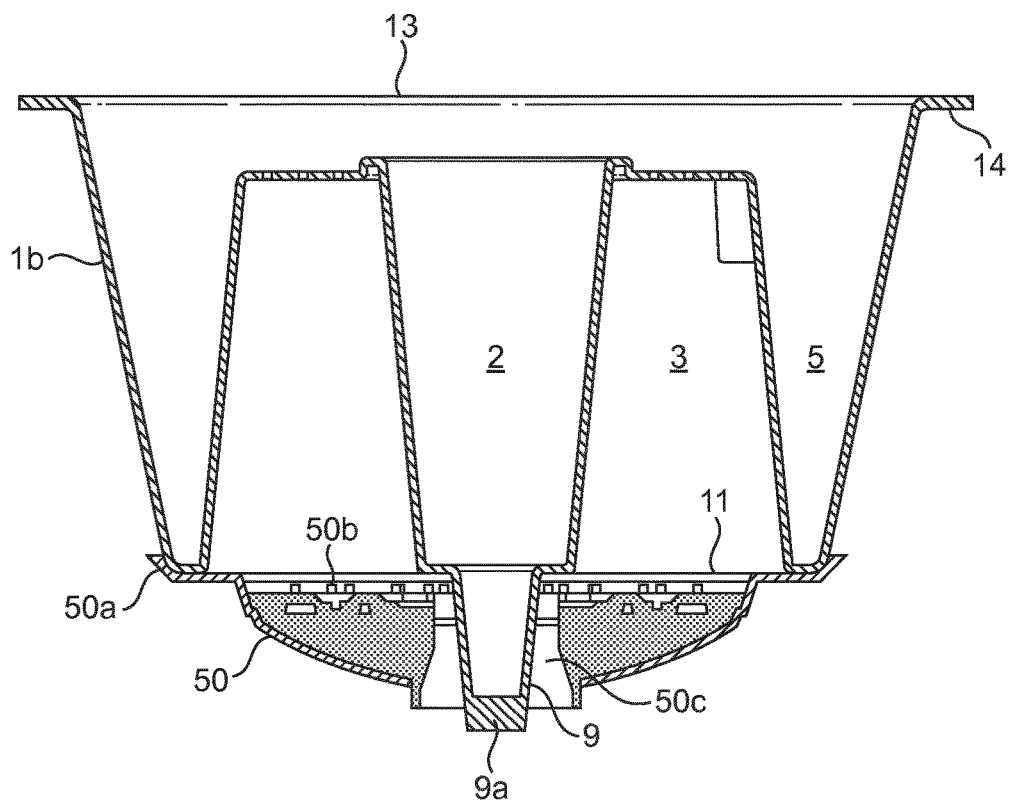
FIGS. 12A and 12B illustrate a preferred embodiment of the cartridge comprising an integrally formed or attached opening means.
Figure 12B:
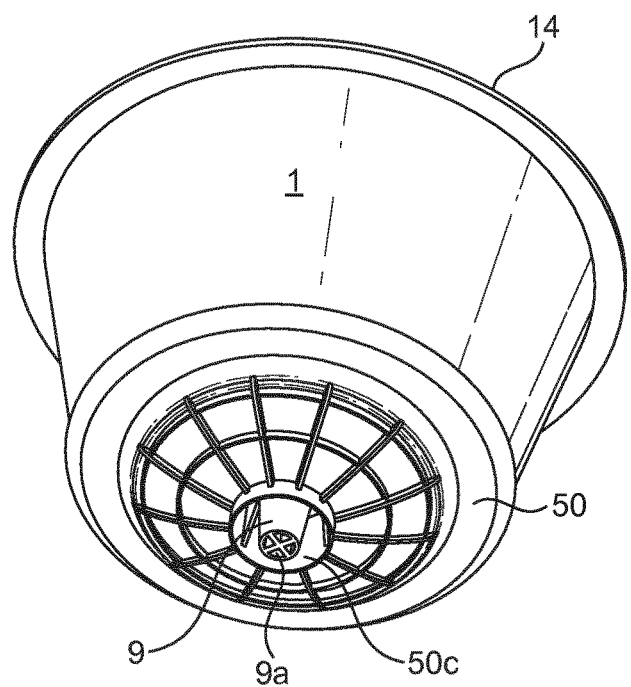

The above-described opening means 21b may as well be directly connected to or integrally formed with the cartridge 1. A preferred example of such arrangement is shown in FIGS. 12A and 12B. Thereby, the cartridge 1 comprises a separate or integrally formed bottom portion 50 comprising the features as described above with respect to the opening means 21b. The bottom portion 50 may be connected to a lower portion of the cartridge body 1b by means of suitably connection means 50a such as hocks, latches or the like. The bottom portion 50 may as well be fixedly connected to the bottom portion 50 e.g. by means of welding or gluing. The bottom portion 50 preferably comprises opening elements 50b designed to open the membrane 11 upon pressure increase within the cartridge 1 as described above with respect to the opening elements 27 of the opening means 21b. The bottom portion 50 comprises an essentially disc-shaped form with a central opening 50c in which the outlet duct 9 is arranged.

Figure 8A:
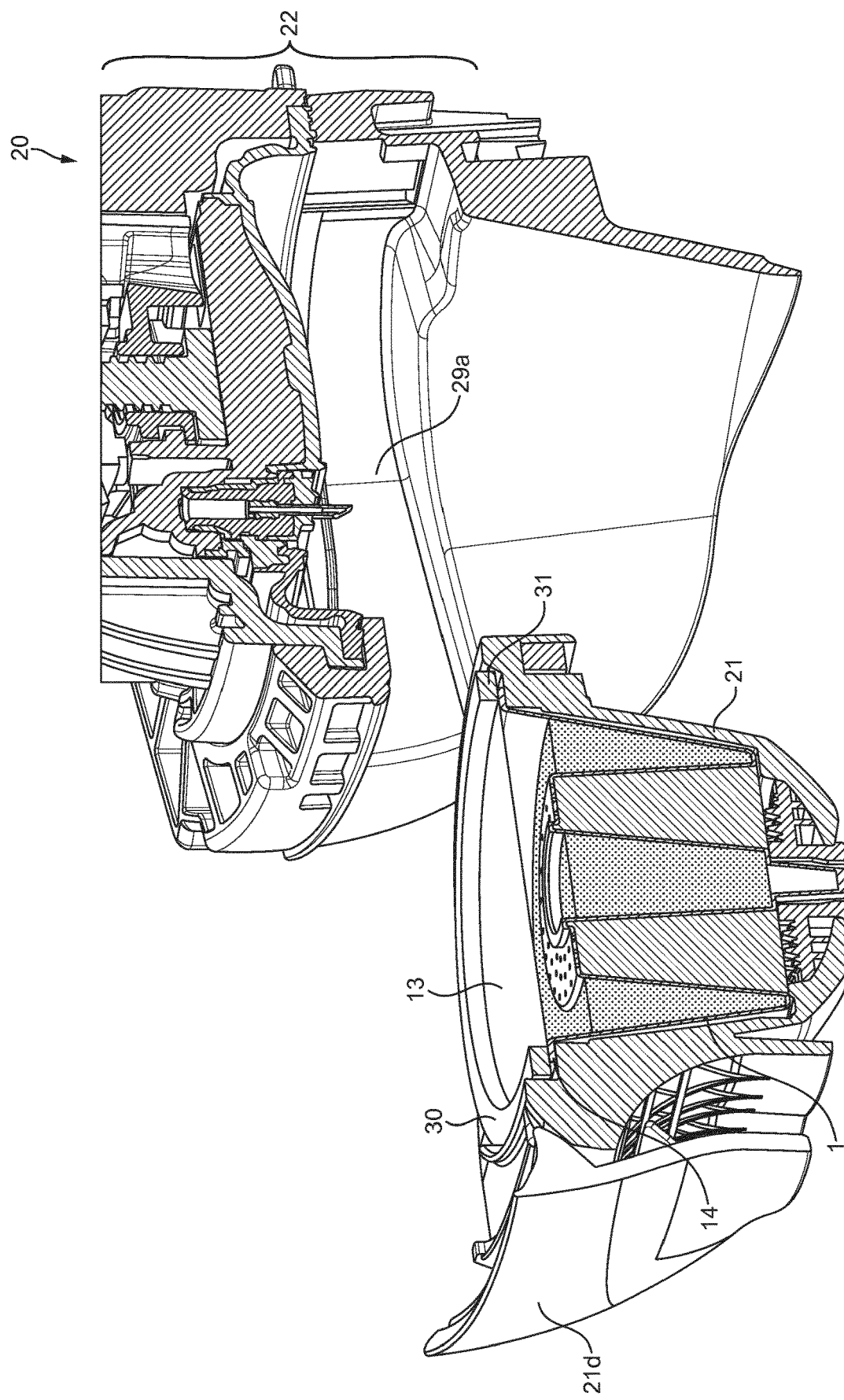
FIGS. 8a and 8b relate to a preferred embodiment of the system comprising the beverage preparation machine and the cartridge according to the invention.
Figure 8B:
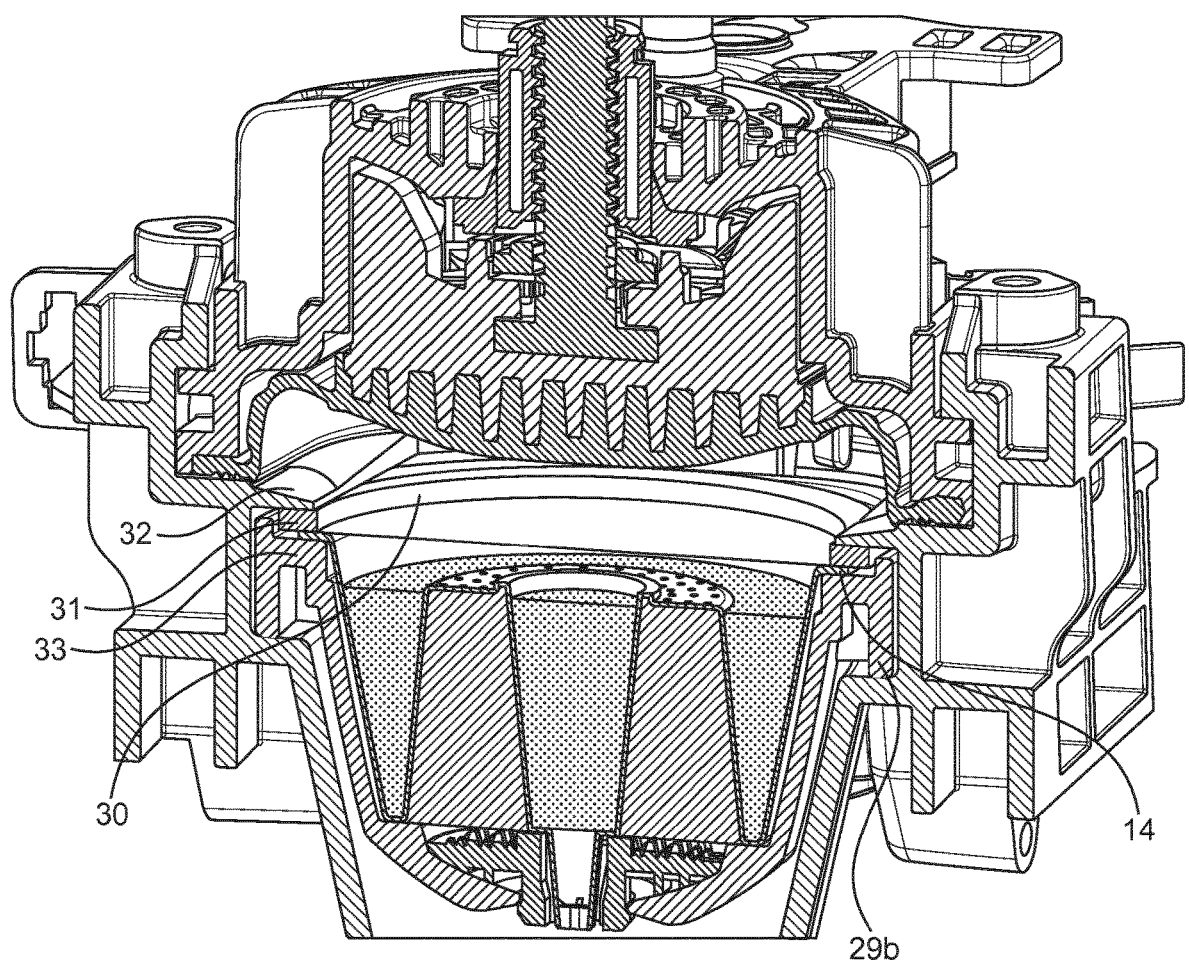

FIGS. 8A and 8B relate to another preferred embodiment of the system according to the invention, the system comprising the beverage preparation machine 20 and the cartridge 1 for being inserted therein. The machine 20 comprises a removable cartridge support 21 in the form of a cartridge holder. The cartridge holder 21 comprises guiding ribs 29b which interact with conformably shaped guiding elements 29a in order to enable a proper positioning of the cartridge support 21 in the machine 20. The cartridge support 21 may further comprise a handle 21d for facilitating handling of the support 21 by a user.

The system as shown in FIGS. 8A and 8B further comprises a sealing ring 30 for being selectively placed onto the cartridge 1 when received by the cartridge support 21 of the machine. The sealing ring 30 is preferably of elastic material such as rubber and is preferably designed to enhance the sealing of the cartridge 1 within the machine 20. The sealing ring 30 is preferably designed such as to fit within a central upper engagement recess 31 of the cartridge support 21. In this position, the flange-like rim 14 of the cartridge is arranged between an upper circumferential support edge 33 of the cartridge support 21 and the ring 30. When the support 21 is provided to the machine 20, the sealing ring 30 is arranged between the upper surface of the cartridge 1 and a lower surface of a protruding circumferentially arranged lip 32 of the injection head 22 of the machine. Accordingly, a very effective sealing of the inlet face 13 of the cartridge is obtained by this arrangement.

Figure 9A:
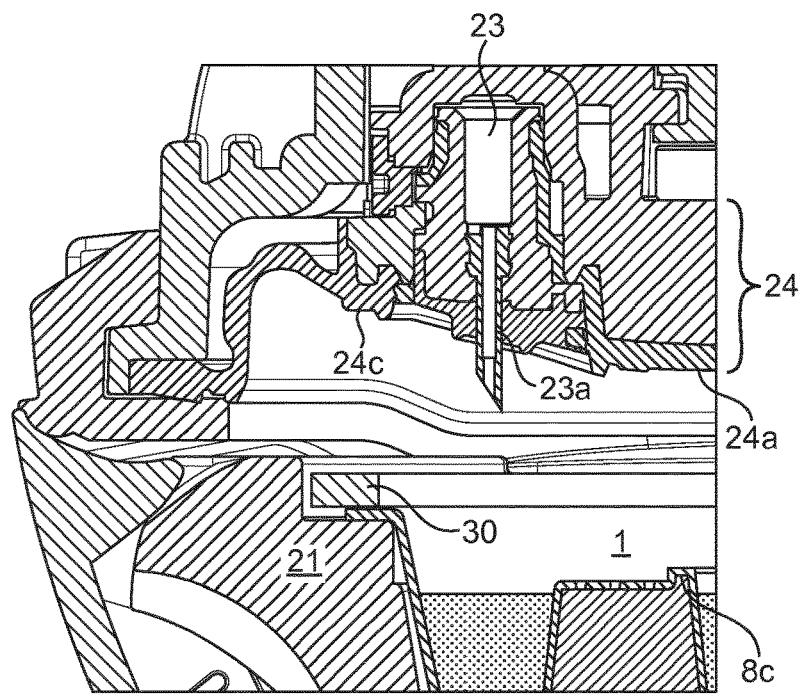
FIGS. 9a to 9c illustrate preferred different positions of an engagement member of the injection head of the machine in the embodiment according to FIGS. 8a and 8b.
Figure 9B:
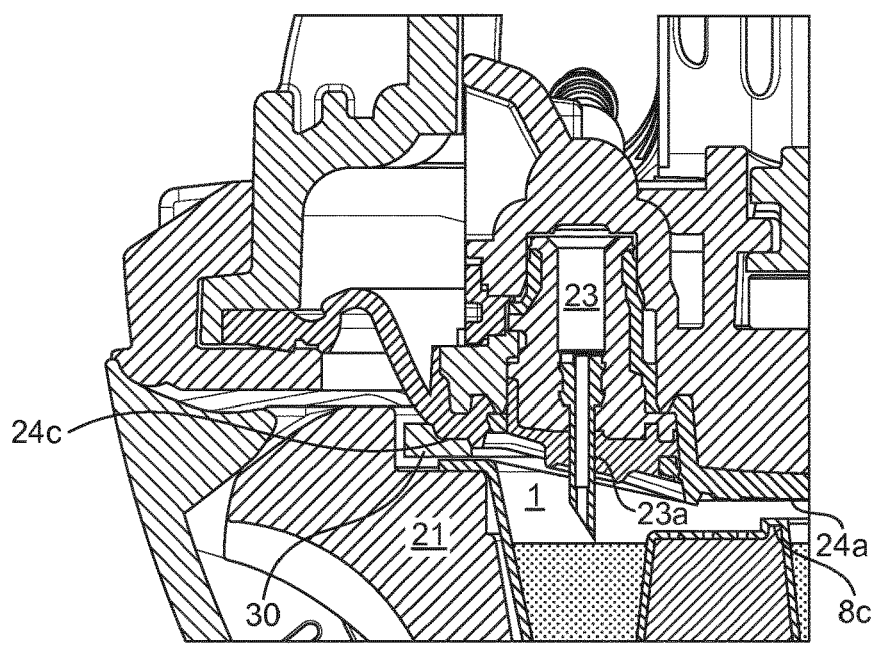
Figure 9C:
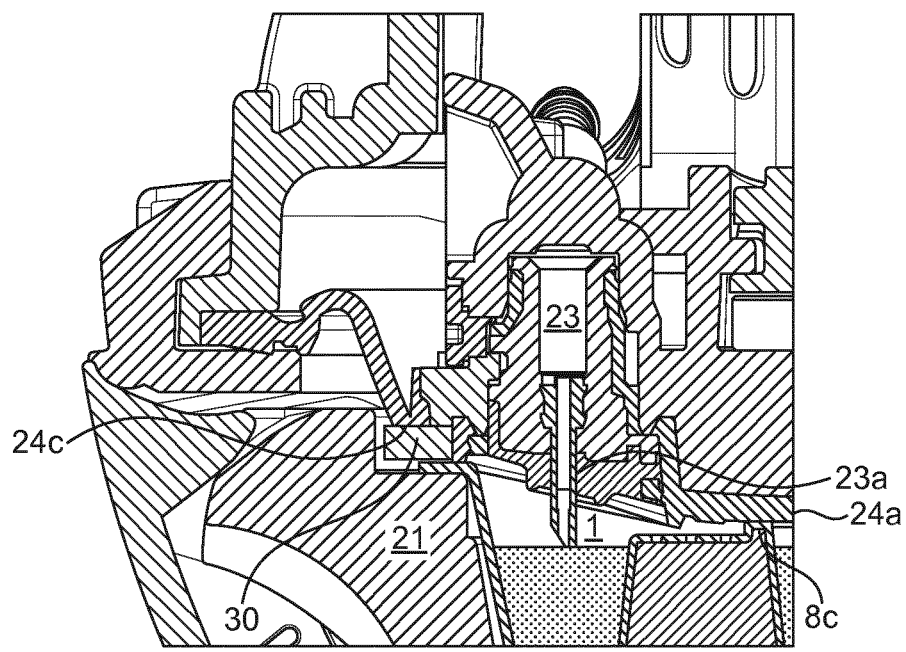

FIGS. 9A to 9C illustrate the system according to FIGS. 8A and 8B during beverage preparation. Thereby, the engagement member 24 does not necessarily have to comprise a sealing lip 24b as shown in the embodiment according to FIG. 4 and FIGS. 5A to 5C. Instead, the sealing of the inlet face 13 of the cartridge 1 is obtained by means of the additionally provided sealing ring 30 when being engaged by the engagement member 24.

As previously explained with reference to FIGS. 5A to 5C, the engagement member 24 is brought from a cartridge insertion position A into the first cartridge engagement position B (see FIG. 9B), in which the liquid injection member 23a perforates the inlet face 13 of the cartridge and injects liquid thereto. In this position, a lower preferably planar circumferential surface 24c of the engagement member 24 engages with the sealing ring 30 such as to provide a circumferential sealing about the upper central surface of the inlet face 13 of the cartridge.

In the second engagement position C (see FIG. 9C) the engagement member 24 is further lowered onto the cartridge 1, whereby the lower circumferential surface 24c of the engagement member 24 is further pressed onto the sealing ring 30. As previously explained with respect to FIGS. 5a to 5c, in this position the engagement member 24 engages the flow dividing means 8 of the cartridge in order to close-off the preferred flow path therein and eject the beverage component from the second compartment of the cartridge.

Figure 11A:
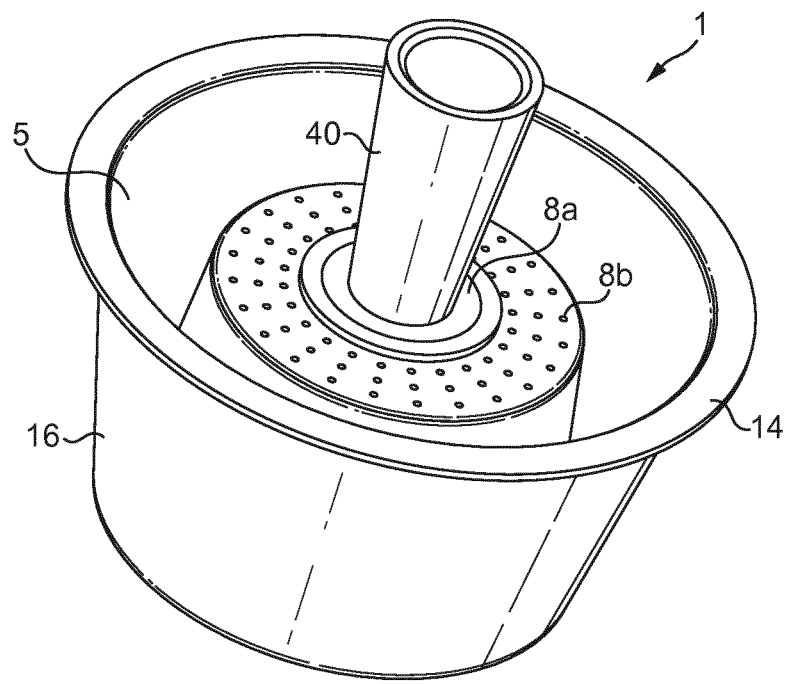
FIGS. 11A and 11B illustrate a preferred embodiment of a cartridge comprising a reinforcement member.
Figure 11B:
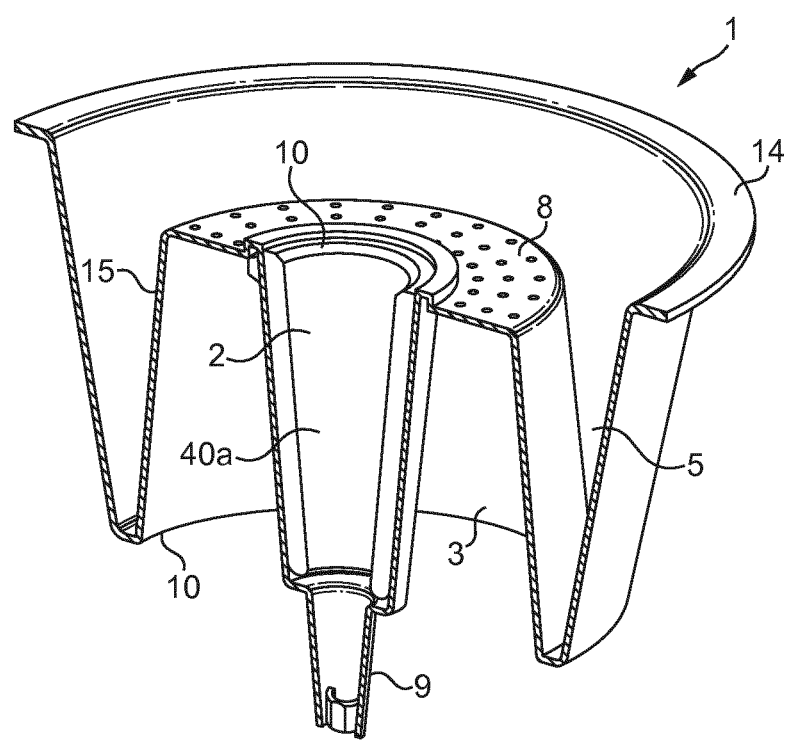

FIGS. 11A and 11B illustrate another preferred embodiment of a cartridge 1, wherein the cartridge comprises a reinforcement member 40. The reinforcement member 40 is preferably designed to at least partially strengthen the cartridge 1. The reinforcement member 40 is preferably of hollow cone- or cylindrically-shaped form. The reinforcement member 40 is preferably inserted into the aperture 8a of the flow dividing means 8. Thereby, an inner hollow channel 40a of the reinforcement member 40 constitutes the first compartment 2 of the cartridge 1.

The reinforcement member 40 is preferably made from plastic material, but may as well be made of different material such as e.g. metal. The reinforcement member preferably extends vertically through the cartridge 1.

The reinforcement member 40 may be designed for opening the tearable or pierceable membrane 12 situated at the bottom region of the first compartment 2 (see e.g. FIG. 2A). For this purpose, the reinforcement member 40 may comprise dedicated opening elements such as protrusions, corrugations or the like in a lower bottom portion thereof and which may be arranged to face the membrane 12.

The invention claimed is:

1. A cartridge for preparation of a beverage upon injection of liquid into the cartridge, the cartridge comprising:
   at least a first compartment and a second compartment configured for holding beverage ingredients, each of the first compartment and the second compartment comprising one or more of the beverage ingredients, and the first compartment and the second compartment are arranged concentrically within the cartridge;

an injection area configured for receiving the liquid injected into the cartridge;

a flow divider designed for providing a fluid communication between the injection area and the first compartment and the second compartment, the flow divider is designed to provide a preferred flow path for the liquid from the injection area to the first compartment or the second compartment and to an outlet of the cartridge, the flow divider being an essentially disc-shaped member comprising a central aperture surrounded by a perforated area, the central aperture is in fluid communication with the first compartment and the perforated area is in fluid communication with the second compartment; and a reinforcement member, and the reinforcement member is a central cylinder or an essentially cone-shaped element.

2. The cartridge according to claim 1, wherein the flow divider is designed to provide a relatively higher flow resistance in the flow path between the injection area and the second compartment than in the flow path between the injection area and the first compartment.

3. A cartridge for preparation of a beverage upon injection of liquid into the cartridge, the cartridge comprising:

at least a first compartment and a second compartment configured for holding beverage ingredients;

an injection area configured for receiving the liquid injected into the cartridge; and a flow divider designed for providing a fluid communication between the injection area and the first compartment and the second compartment, the flow divider is designed to provide a preferred flow path for the liquid from the injection area to the first compartment or the second compartment and to an outlet of the cartridge, the flow divider being an essentially disc-shaped member comprising a central aperture surrounded by a perforated area, the central aperture is in fluid communication with the first compartment and the perforated area is in fluid communication with the second compartment;

wherein the flow divider is designed to selectively close-off the preferred flow path upon engagement with an engagement member of a beverage preparation machine.

4. The cartridge according to claim 1, wherein the flow divider is arranged essentially in parallel to an upper inlet face and/or a flange like rim of the cartridge.

5. The cartridge according to claim 1, wherein an engagement portion is arranged between the central aperture and the perforated area.

6. A cartridge for preparation of a beverage upon injection of liquid into the cartridge, the cartridge comprising:

at least a first compartment and a second compartment configured for holding beverage ingredients;

an injection area configured for receiving the liquid injected into the cartridge; and a flow divider designed for providing a fluid communication between the injection area and the first compartment and the second compartment, the flow divider is designed to provide a preferred flow path for the liquid from the injection area to the first compartment or the second compartment and to an outlet of the cartridge, the flow divider being an essentially disc-shaped member comprising a central aperture surrounded by a perforated area, the central aperture is in fluid communication with the first compartment and the perforated area is in fluid communication with the second compartment;

wherein a preferably circular engagement portion is arranged between the central aperture and the perforated area;

wherein the engagement portion is designed to be engaged by a dedicated engagement member of a beverage preparation machine to be used in conjunction with the cartridge to selectively close-off a flow path between the injection area and the first compartment.

7. The cartridge according to claim 1, wherein the perforated area comprises a plurality of apertures or holes with a diameter of between 0.2 to 1.2 mm.

8. The cartridge according to claim 1, wherein the outlet of the cartridge comprises a first outlet in fluid communication with the first compartment and a second outlet in fluid communication with the second compartment.

9. The cartridge according to claim 8, wherein the first and second outlets are each covered by a puncturable or a tearable membrane.

10. The cartridge according to claim 1, wherein the first compartment and the second compartment vertically extend from the flow divider to a lower portion of the cartridge.

11. The cartridge according to claim 8, wherein each of the first compartment and the second compartment comprises the first outlet and the second outlet, respectively, each of the first outlet and the second outlet configured to dispense the beverage out of the cartridge.

12. The cartridge according to claim 5, wherein the engagement portion is circular.

* * * * *

UNITED STATES PATENT AND TRADEMARK OFFICE
CERTIFICATE OF CORRECTION

PATENT NO. : 11,780,669 B2
APPLICATION NO. : 16/461978
DATED : October 10, 2023
INVENTOR(S) : Christian Talon It is certified that error appears in the above-identified patent and that said Letters Patent is hereby corrected as shown below:

On the Title Page

Item [71] change the applicant name from "NESTEC S.A." to "SOCIÉTÉ DES PRODUITS NESTLÉ S.A."

Signed and Sealed this
Fifth Day of March, 2024

Katherine Kelly Vidal
Director of the United States Patent and Trademark Office